United States Patent
Ohtsuka et al.

(10) Patent No.: US 9,921,376 B2
(45) Date of Patent: Mar. 20, 2018

(54) OPTICAL FIBER WITH CONNECTOR

(71) Applicant: SEI Optifrontier Co., Ltd., Yokohama-shi, Kanagawa (JP)

(72) Inventors: Kenichiro Ohtsuka, Chigasaki (JP); Kotaro Ueda, Chigasaki (JP); Tsutomu Kamada, Chigasaki (JP); Junji Fukui, Chigasaki (JP); Masashi Oka, Chigasaki (JP)

(73) Assignee: SEI Optifrontier Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/957,872

(22) Filed: Dec. 3, 2015

(65) Prior Publication Data

US 2017/0160495 A1  Jun. 8, 2017

(51) Int. Cl.
*G02B 6/38* (2006.01)

(52) U.S. Cl.
CPC ......... *G02B 6/3885* (2013.01); *G02B 6/3882* (2013.01)

(58) Field of Classification Search
None
See application file for complete search history.

(56) References Cited

U.S. PATENT DOCUMENTS

| | | | |
|---|---|---|---|
| 5,568,576 A | 10/1996 | Takai et al. | |
| 6,758,600 B2 | 7/2004 | Del Grosso et al. | |
| 6,869,227 B2 | 3/2005 | Del Grosso et al. | |
| 7,147,383 B2 | 12/2006 | Sullivan | |
| 7,184,635 B2 | 2/2007 | Livingston | |
| 7,237,966 B2 | 7/2007 | Quinby et al. | |
| 7,416,347 B2 | 8/2008 | Livingston et al. | |
| 7,689,079 B2 | 3/2010 | Burnham et al. | |
| 7,756,371 B1 | 7/2010 | Burnham et al. | |
| 8,009,959 B2 | 8/2011 | Barnes et al. | |
| 8,251,591 B2 | 8/2012 | Barnes et al. | |
| 8,485,737 B2 | 7/2013 | Kolesar | |
| 8,622,631 B2 | 1/2014 | Kolesar | |
| 8,636,424 B2 | 1/2014 | Kuffel et al. | |
| 8,861,918 B2 | 10/2014 | Vazquez et al. | |
| 8,873,967 B2 | 10/2014 | Barnes et al. | |
| 9,020,309 B2 | 4/2015 | Kolesar | |
| 9,057,863 B2 | 6/2015 | Rhoney et al. | |

(Continued)

FOREIGN PATENT DOCUMENTS

JP      2008-310047 A  * 12/2008

*Primary Examiner* — Mike Stahl
(74) *Attorney, Agent, or Firm* — Drinker Biddle & Reath LLP

(57) ABSTRACT

An optical fiber with a connector includes a first connector and a plurality of optical fibers attached to the first connector. The first connector includes: at least one fiber-shaped member; and a ferrule including a first end surface and a second end surface arranged in a first direction, and a holding portion holding the optical fibers and the fiber-shaped member. In the holding portion, a plurality of fiber insertion holes extending from the first end surface in the first direction is formed such that the optical fibers and the fiber-shaped member are insertable thereinto. One end of the optical fiber and one end of the fiber-shaped member are held by the holding portion in a state of being inserted into the fiber insertion hole. The optical fiber extends to the outside of the ferrule. The other end of the fiber-shaped member is located inside the ferrule.

7 Claims, 7 Drawing Sheets

(56) References Cited

U.S. PATENT DOCUMENTS

| | | |
|---|---|---|
| 9,097,874 B2 | 8/2015 | Coleman et al. |
| 2003/0072535 A1* | 4/2003 | Sun ...................... G02B 6/3608 385/59 |
| 2005/0084216 A1* | 4/2005 | Yang ...................... G02B 6/381 385/71 |
| 2005/0201691 A1* | 9/2005 | Mudd .................. G02B 6/3885 385/71 |
| 2005/0207709 A1 | 9/2005 | Del Grosso et al. |
| 2007/0036552 A1 | 2/2007 | Weaver |
| 2008/0101751 A1* | 5/2008 | Luther .................. G02B 6/3885 385/59 |
| 2009/0238577 A1 | 9/2009 | Tamanuki et al. |
| 2012/0189259 A1 | 7/2012 | Manes |
| 2012/0275753 A1 | 11/2012 | Reinhardt |
| 2012/0288233 A1 | 11/2012 | Barnes et al. |
| 2012/0301136 A1 | 11/2012 | Chang |
| 2013/0308915 A1 | 11/2013 | Buff et al. |
| 2014/0133810 A1* | 5/2014 | Schneider ............ G02B 6/3608 385/89 |
| 2014/0140660 A1 | 5/2014 | Buff et al. |
| 2015/0027967 A1 | 1/2015 | Vazquez et al. |
| 2015/0162982 A1 | 6/2015 | Buff et al. |
| 2015/0286024 A1 | 10/2015 | Kolesar |
| 2015/0326316 A1* | 11/2015 | Watanabe ............... H04B 10/27 398/58 |
| 2015/0331192 A1 | 11/2015 | Hall |

\* cited by examiner

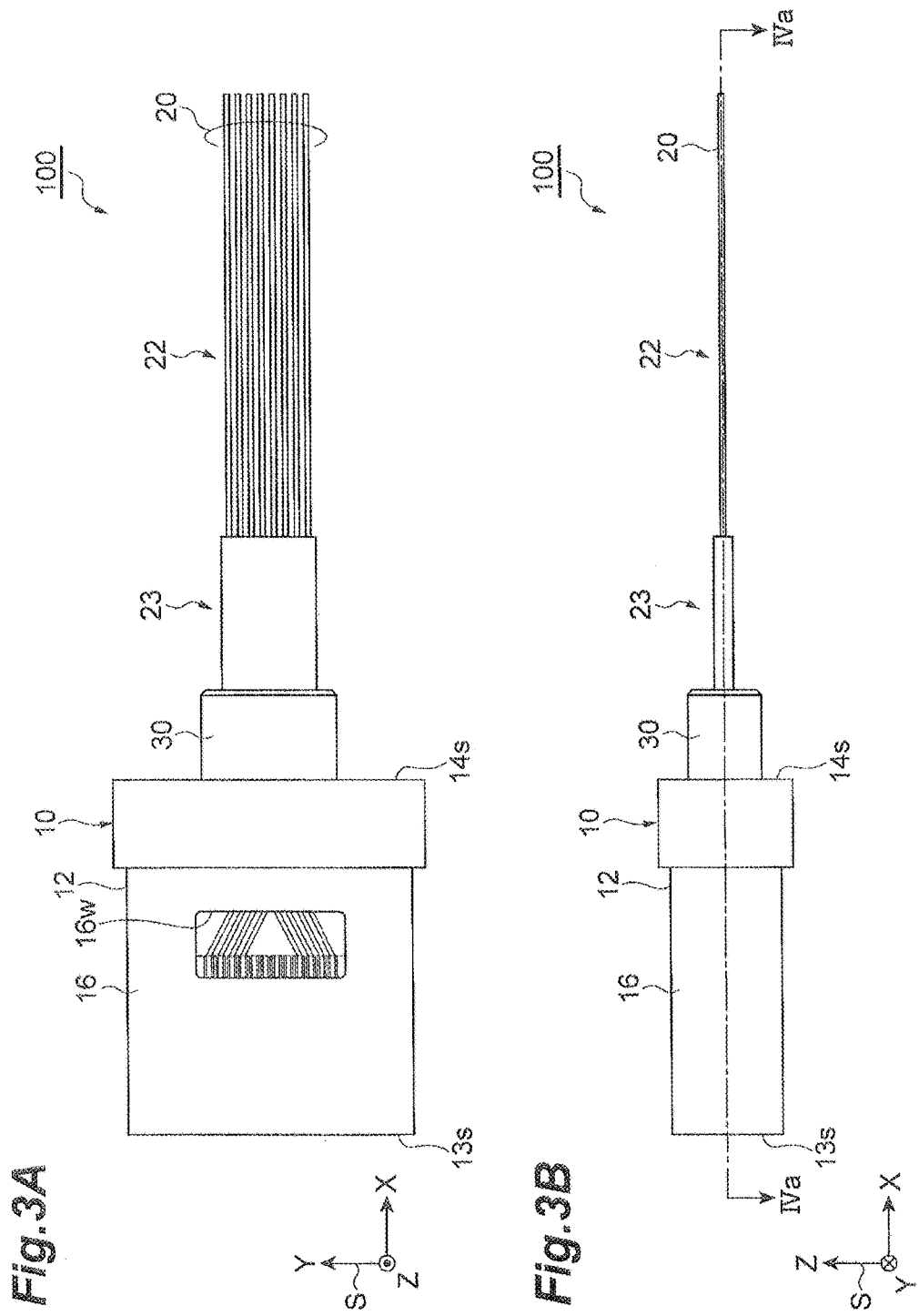

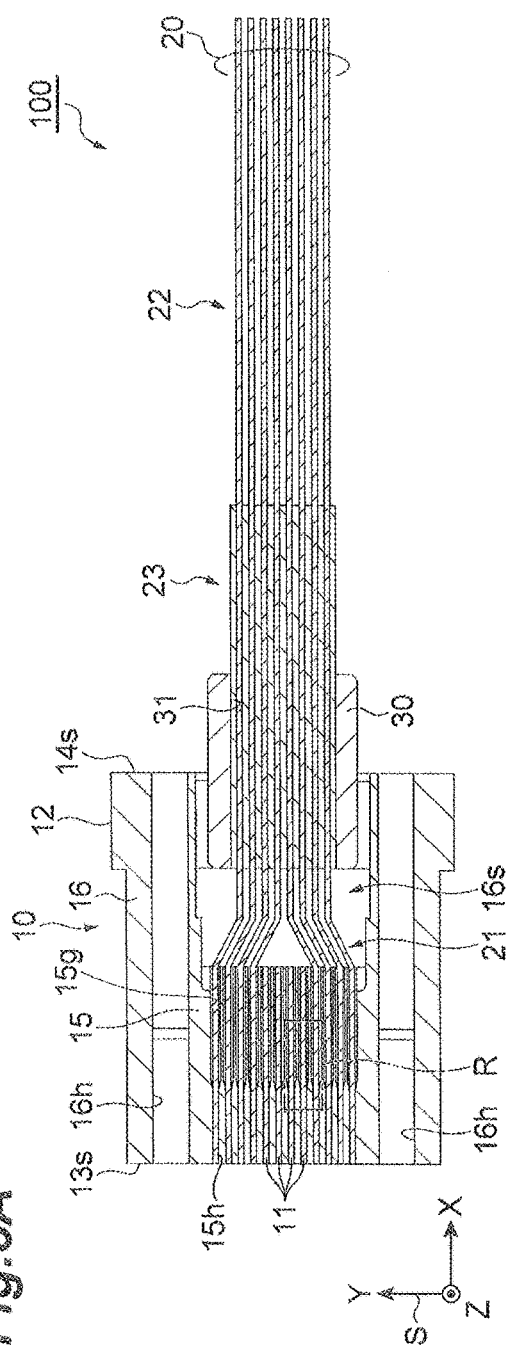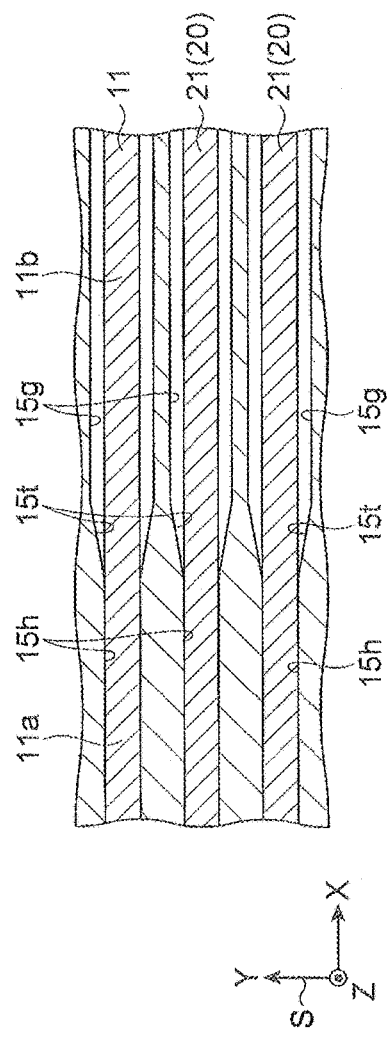
Fig. 5A
Fig. 5B

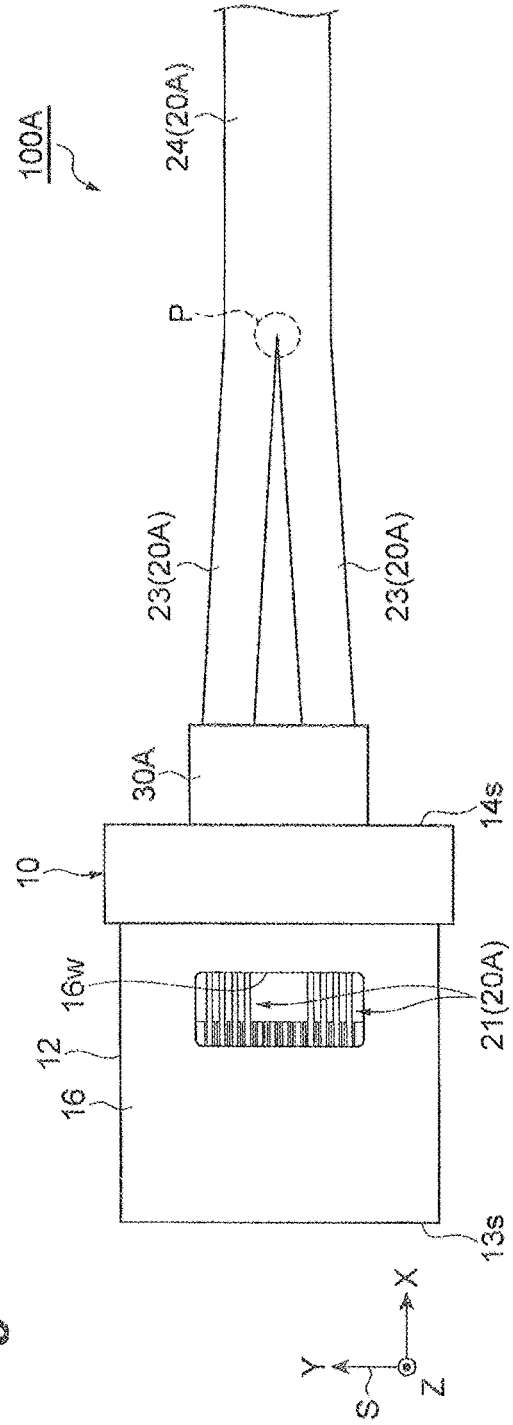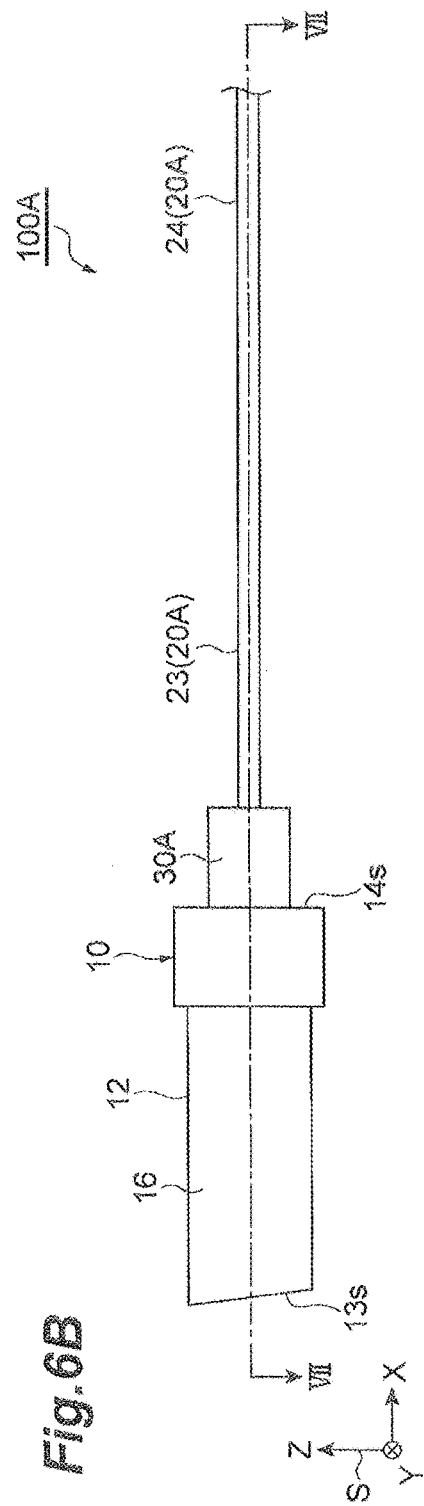
Fig. 6A
Fig. 6B

OPTICAL FIBER WITH CONNECTOR

TECHNICAL FIELD

The present subject matter relates generally to optical fibers with a connector.

BACKGROUND

Optical fibers are used in various types of communication networks for facilitating data transfer at a rate of at least one gigabit per second (i.e., "Gbps" or "G"). Traditional 1G and 10G networks, in which data is transferred at a rate of 1 Gbps and 10 Gbps, respectively, are based upon a 12-count ("12ct") fiber and/or a structured cabling system (SCS) utilizing a 12ct fiber basis. That is, the base unit of network hardware including cables, ribbon cables, trunk cables, connectors, converters, adapters, patches, etc., of traditional networks is a 12ct fiber.

The demand for faster data transfer (e.g., at a rate of 40G, 100G, 400G etc.) is ever increasing, in part due to the onset of smart technology, which utilize fiber networks and/or components thereof for accessing (i.e., sending/receiving) data from network carriers/providers, media outlets, the cloud, data applications, social media applications, etc. Network providers can utilize data centers for housing network hardware or components, including servers, transceivers, receivers, communication modules, converters, connectors, plates, patches, racks, routers, switches, ports, etc., for supporting 1G/10G/40G/100G networks. Conventional networks and network data centers utilize hardware based upon the traditional 12ct fiber.

In faster networks, such as in 40G and 100G networks, only 8 of the 12 optical fibers are typically utilized for facilitating data transmission. Thus, conventional networks have extensive amounts of unused (e.g., wasted) optical fibers. This is costly and expensive to manufacture and maintain. In addition, expensive converters or conversion modules must be used to convert, upgrade, and/or otherwise scale slower networks (i.e., 1G, 10G) into faster networks (i.e., 40G, 100G etc.).

SUMMARY

FIG. 1 illustrates a conventional multi-fiber push on (MPO) connector device, generally designated MPO, utilized in conventional fiber networks. MPO connector includes a 12ct basis. As noted above, in 40G and 100G networks, only 8 of the 12 optical fibers may be used for facilitating data transmission (e.g., 4×TX and 4×RX). The middle four optical fibers, generally designated FM, are present in the middle ferrule positions of MPO, but are unused and may be referred to as "dark". The outer optical fibers generally designated FO are disposed on outermost positions of MPO and are used for transmission/receipt of data in a communication network. In traditional networks using traditional practices of 12ct SCS, the middle four optical fibers FM result in an optical fiber waste of about 33%, as roughly about ⅓ of the optical fibers are unused. This is wasteful, expensive, and inefficient, especially for networks utilizing optical multi-mode (OM) fibers as described by ISO 11801 and/or as defined in TIA-492-AAAD. The 33% optical fiber waste amounts to a considerable waste in terms of dollars, materials, resources, and space, which is unacceptable, especially in large networks utilizing data centers having hundreds of ports.

According to a connector based on a reduced fiber count, an optical fiber waste can be suppressed. For example, in the MPO connector including the 12 ct basis illustrated in FIG. 1, the fiber count can be reduced by omitting the middle four fibers FM. On the other hand, the following other requirements may occur. That is, in a case where the middle four fibers FM are omitted as in the above example, the four unused fiber insertion holes are generated for the ferrule. Therefore, when the end surface of the optical fiber and the ferrule are polished, it is desirable to suppress the penetration of an abrasive or the like into the unused fiber insertion hole. In addition, in a portion adjacent to the fiber insertion hole into which the optical fiber is inserted in the ferrule and a portion adjacent to the unused fiber insertion hole, it is desirable to suppress an occurrence of a difference in a polished state of the end surface of the ferrule and enable the end surface of the ferrule to be uniformly polished.

In this specification, there is provided an optical fiber with a connector. The optical fiber with the connector includes a first connector and a plurality of optical fibers attached to the first connector. The first connector includes: at least one fiber-shaped member, and a ferrule including a first end surface and a second end surface arranged in a first direction, and a holding portion holding the optical fibers and the fiber-shaped member. In the holding portion, a plurality of fiber insertion holes extending from the first end surface in the first direction is formed such that the optical fibers and the fiber-shaped member are insertable thereinto. One end portion of the optical fiber and one end portion of the fiber-shaped member are held by the holding portion in a state of being inserted into the fiber insertion hole. The optical fiber extends to the outside of the ferrule beyond the second end surface. The other end portion of the fiber-shaped member is located inside the ferrule.

BRIEF DESCRIPTION OF THE DRAWINGS

FIG. 3A is a top view illustrating an example of an optical fiber with a connector according to a first embodiment;

FIG. 3B is a side view illustrating an example of the optical fiber with the connector according to the first embodiment;

FIG. 5A is a cross-sectional view taken along line IVa-IVa of FIG. 3B;

FIG. 5B is an enlarged view of a region R of FIG. 5A;

FIG. 6A is a top view of an optical fiber with a connector according to a second embodiment;

FIG. 6B is a side view of the optical fiber with the connector according to the second embodiment.

DETAILED DESCRIPTION

Figure 1:
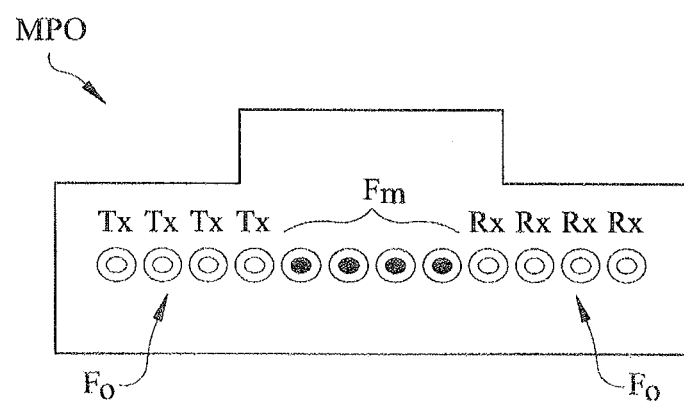
FIG. 1 illustrates a conventional multi-fiber push on (MPO) connector device, generally designated MPO, utilized in conventional fiber networks.

An embodiment of an optical fiber with a connector will be described. An optical fiber with a connector according to an embodiment includes a first connector and a plurality of optical fibers attached to the first connector. The first connector includes at least one fiber-shaped member, and a ferrule including a first end surface and a second end surface arranged in a first direction and a holding portion holding the optical fibers and the fiber-shaped member. In the holding portion, a plurality of fiber insertion holes extending from the first end surface in the first direction is formed such that the optical fibers and the fiber-shaped member are insertable thereinto. One end portion of the optical fiber and one end portion of the fiber-shaped member are held by the holding portion in a state of being inserted into the fiber insertion hole. The optical fiber extends to the outside of the ferrule beyond the second end surface. The other end portion of the fiber-shaped member is located inside the ferrule.

Due to this, it is possible to suppress the penetration of an abrasive or the like into the unused fiber insertion holes. In addition, in a portion adjacent to the fiber insertion hole into which the optical fiber is inserted in the ferrule and a portion adjacent to the unused fiber insertion hole, it is possible to suppress an occurrence of a difference in a polished state of the end surface of the ferrule and enable the end surface of the ferrule to be uniformly polished.

In the optical fiber with the connector according to the embodiment, the fiber-shaped member may include a glass fiber. In the optical fiber with the connector according to the embodiment, three or more of the fiber insertion holes may be provided in the holding portion so as to be arranged in a second direction intersecting with the first direction. The fiber-shaped member may be inserted into the fiber insertion hole of the central side of the holding portion in the second direction among the plurality of fiber insertion holes.

In the optical fiber with the connector according to the embodiment, twelve of the fiber insertion holes may be provided in the holding portion, and the fiber-shaped member may be inserted into the four fiber insertion holes of the central side of the holding portion in the second direction among the plurality of fiber insertion holes. In the optical fiber with the connector according to the embodiment, a covering of the optical fiber may be removed in a portion located outside the ferrule.

In the optical fiber with the connector according to the embodiment, the plurality of optical fibers may be integrated in the outside of the ferrule. In the optical fiber with the connector according to the embodiment, the plurality of optical fibers may be divided into two parts in the inside of the ferrule. In the optical fiber with the connector according to the embodiment, the other end portion of the optical fiber may be attached to a second connector. In the optical fiber with the connector according to the embodiment, the second connector may have the same configuration as the first connector.

Figure 2A:
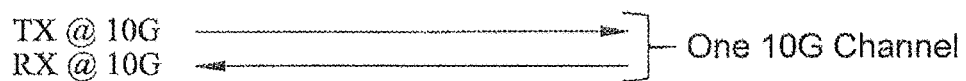
FIGS. 2A to 2C are schematic diagrams illustrating parallel optics used to facilitate data transmission at 10G, 40G, 100G, or more than 100G signals, according to some embodiments.

Subsequently, a specific example of the embodiment of the optical fiber with the connector will be described. The optical fiber with the connector according to the embodiment utilize parallel optics for simultaneously transmitting and receiving data over multiple optical fibers within a network and respective data centers. For example, as FIG. 2A illustrates, one 100 channel can consist of two parallel fibers for transmitting/receiving communication signals simultaneously. One optical fiber transmits data at 10G and another optical fiber receives data simultaneously at 10G. As used herein, the acronym or abbreviation "TX" denotes the transmission, transmit, and/or transmittal or transmitting of data or information. The acronym "RX" denotes the reception, to receive, and/or receiving of data or information.

Thus, two parallel fibers (e.g., 1×TX and 1×RX) are necessary for one 10G channel or port in 10G/400/100G/400G networks.

Figure 2B:
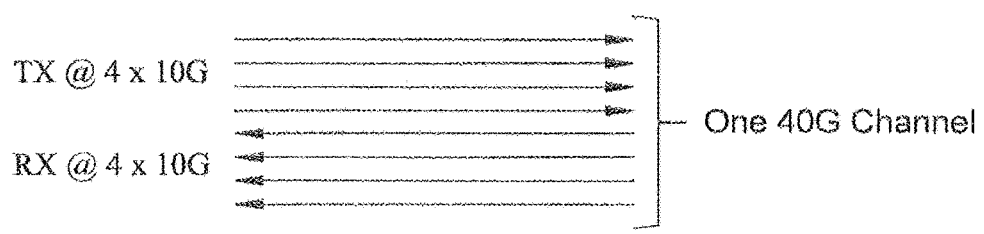

To provide faster data transfer, one 40G channel may include a total of eight optical fibers, for example, 4×TX and 4×RX. As FIG. 2B illustrates, one 40G channel consists only of four optical fibers for transmitting data (i.e., each at 10G) and four optical fibers for receiving data (i.e., each at 10G). Thus, only eight parallel fibers can be utilized for one 400 channel or port, where each optical fiber is configured to TX/RX at 10G.

Figure 2C:
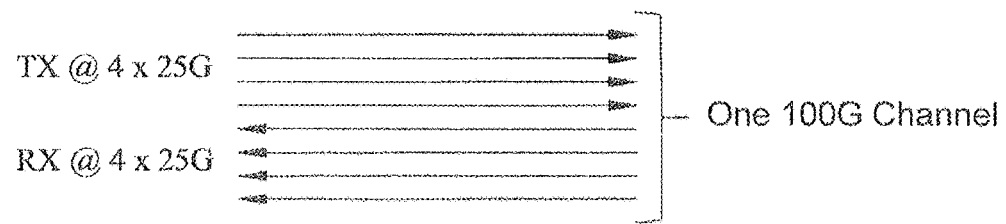

FIG. 2C illustrates one 100G channel or port utilizing parallel optics, in which the signal across each optical fiber is 25G as opposed to 10G. One 100G channel can also include a total of eight optical fibers, for example, 4×TX and 4×RX. As FIG. 2C illustrates, one 100G channel can consist of four optical fibers for transmitting data (i.e., each at 25G) and four optical fibers for receiving data (i.e., each at 25G). Thus, only eight parallel fibers can be utilized for one 100G channel or port, where each optical fiber is configured to TX/RX at 25G. FIGS. 2B and 2C comprise a "4 by" parallel optics in which four separate channels are utilized for transmitting (TX) and receiving (RX) data.

Notably, the optical fiber with the connector according to the present embodiment advantageously allow for 100% end-to-end fiber utilization within a passive network, whereby all eight optical fibers of an 8ct fiber basis are utilized, accounting for at least approximately 0% fiber waste. Utilizing 8ct fiber as the basic fiber structure for the optical fiber with the connector according to the present embodiment is advantageous or beneficial in terms of network design, management, construction, and overall economy of the network.

Figure 4A:
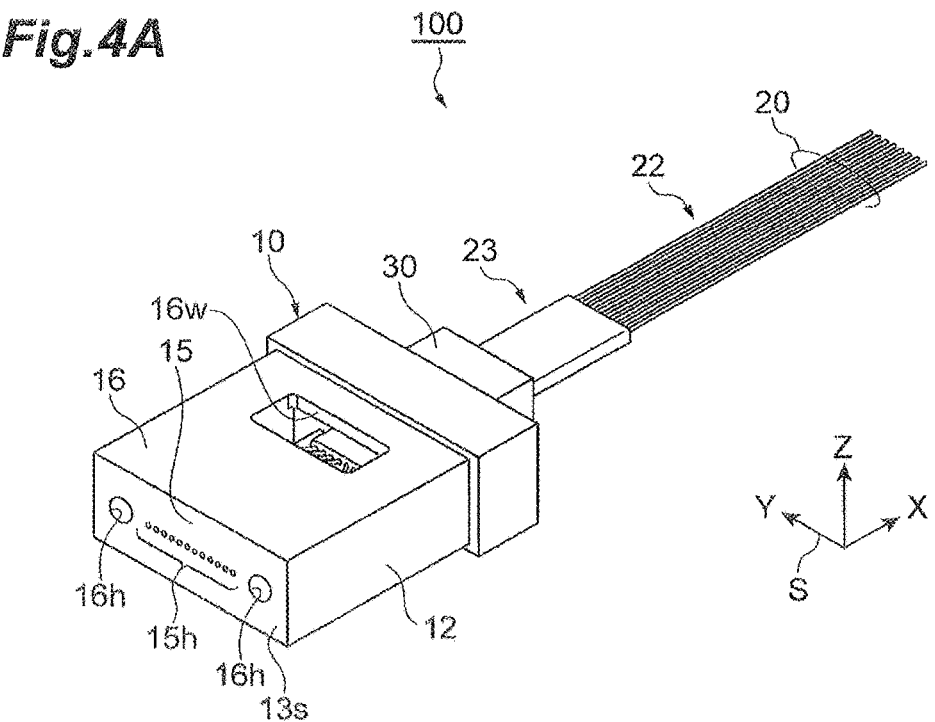
FIG. 4A is a perspective view illustrating an example of the optical fiber with the connector according to the first embodiment.
Figure 4B:
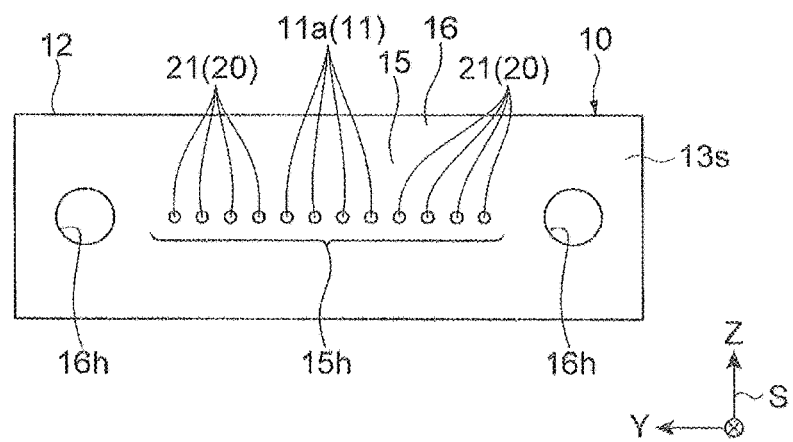
FIG. 4B is a diagram illustrating an example of an end surface of the optical fiber with the connector according to the first embodiment.

FIG. 3A is a top view illustrating an example of an optical fiber with a connector according to a first embodiment FIG. 3B is a side view illustrating an example of the optical fiber with the connector according to the first embodiment. FIG. 4A is a perspective view illustrating an example of the optical fiber with the connector according to the first embodiment. FIG. 4B is a diagram illustrating an example of an end surface of the optical fiber with the connector according to the first embodiment. FIG. 5A is a cross-sectional view taken along line Va-Va of FIG. 3B. FIG. 5B is an enlarged view of a region R of FIG. 5A. In each figure, an orthogonal coordinate system S is illustrated for ease of understanding.

An optical fiber with the connector 100 illustrated in each figure is utilized in networks communicating at least at 40G, such as 100G In other embodiments, the optical fiber with the connector 100 is utilized in networks communicated at more than 100G such as 400G. The optical fiber with the connector 100 is based upon a reduced fiber count, such as an 8ct fiber according to some embodiments.

The optical fiber with the connector 100 includes a connector (first connector) 10, a plurality of optical fibers 20, and a boot 30. The connector 10 is, for example, a multi-fiber push on (MPO) connector. The connector 10 includes at least one fiber-shaped member 11 and a ferrule 12. The number of the fiber-shaped members 11 is, for example, four. The number of the fiber-shaped members 11 may be equal to the number obtained by subtracting the number of the optical fibers 20 from the number of fiber insertion holes 15h to be described below.

The fiber-shaped member 11 is made of, for example, glass or ceramic in a cylindrical and fiber shape. That is, the fiber-shaped member 11 include, for example, a glass fiber. A diameter of the fiber-shaped member 11 is substantially equal to, for example, a diameter of the glass fiber of the optical fiber 20. As one example, in a case where the fiber-shaped member 11 is the glass fiber, the fiber-shaped member 11 may have the same configuration as the glass fiber of the optical fiber 20. In this case, the fiber-shaped member 11 may be manufactured by using an edge material generated when the optical fiber 20 is processed to a predetermined length.

The ferrule 12 includes a first end surface 13s and a second end surface 14s arranged along a first direction (for example, X-axis direction of orthogonal coordinate system S). The ferrule 12 includes a holding portion 15 and a frame portion 16. The holding portion 15 is integrally formed with the frame portion 16 so as to be surrounded by the frame portion 16. The holding portion 15 and the frame portion 16 constitute the first end surface 13s at one end. The frame portion 16 constitutes the second end surface 14s at the other end. The holding portion 15 holds the fiber-shaped member 11 and the optical fiber 20.

In the holding portion 15, a plurality of fiber insertion holes 15h is formed such that the fiber-shaped member 11 and the optical fiber 20 are insertable thereinto. The fiber insertion holes 15h are opened on the first end surface 13s of the ferrule 12. The fiber insertion holes 15h extends from the first end surface 13s toward the second end surface 14s along a first direction. The fiber insertion holes 15h are arranged in a row along a second direction intersecting with the first direction (for example, Y-axis direction of orthogonal coordinate system S). Thus, openings of the fiber insertion holes 15h in the first end surface 13s also are arranged in a row along the second direction. The number of the fiber insertion holes 15h is, for example, three or more. As one example, the number of the fiber insertion holes 15h is twelve.

In the holding portion 15, a plurality of fiber arrangement grooves 15g is formed such that the fiber-shaped member 11 and the optical fibers 20 can be arranged. The fiber arrangement grooves 15g extend from an end of the second end surface 14s side of the fiber insertion hole 15h toward the second end surface 14s along the first direction and reaches an end of the holding portion 15 of the second end surface 14s side. The fiber arrangement grooves 15g are connected to the fiber insertion holes 15h through a taper portion 15t gradually reduced from the second end surface 14s toward the first end surface 13s. Thus, the number of the fiber arrangement grooves 15g is equal to the number of the fiber insertion holes 15h. The fiber arrangement grooves 15g are arranged in a row along the second direction.

The frame portion 16 constitutes the outer shape of the ferrule 12. The frame portion 16 has, for example, a rectangular parallelepiped shape. In the frame portion 16, space 16s opened in the second end surface 14s is formed. The fiber insertion holes 15h and the fiber arrangement grooves 15g face the space 16s and are opened in the space 16s. When viewed from a third direction (for example, Z-axis direction of orthogonal coordinate system S) intersecting with the first direction and the second direction, a window portion 16w is formed in a portion corresponding to the space 16s of the frame portion 16. Thus, the space 16s is also opened in the window 16w.

In addition, a pair of guide pin insertion holes 16h, which are used to connect the connector 10 to another connector or the like, are formed in the frame portion 16. The guide pin insertion holes 16h extend along the first direction so as to reach the second end surface 14s from the first end surface 13s. The guide pin insertion holes 16h are arranged so as to sandwich the fiber insertion holes 15h from both sides of the second direction.

The optical fibers 20 are attached to the connector 10. The number of the optical fibers 20 is less than the number of the fiber insertion holes 15h. For example, the number of the optical fibers 20 is eight. In this case, the optical fibers 20 include, for example, four TX fibers and four RX fibers. Each of the optical fibers 20 includes one end portion 21, other end portion 22, and an intermediate portion 23 between the one end portion 21 and the other end portion 22. The one end portion 21 is located inside the ferrule 12. The one end portion 21 is held by the holding portion 15 in a state of being inserted into the fiber insertion hole 15h and arranged in the fiber arrangement groove 15g.

The other end portion 22 is located outside the ferrule 12. That is, the optical fiber 20 extends to the outside of the ferrule 12 beyond the second end surface 14s. In the other end portion 22 of the optical fiber 20, another connector (second connector: not illustrated) is attached. Another connector may be a conventional connector and may be a connector having the same configuration as the connector 10.

The plurality of optical fibers 20 are integrated by being covered with a tape covering in a lump, for example, in a state of being arranged in a row in the intermediate portion 23. On the other hand, the plurality of optical fibers 20 are not covered with at least a tape covering and not integrated in the one end portion 21 and the other end portion 22. More specifically, each of the optical fibers 20 includes a glass fiber and a fiber covering that covers the glass fiber. In the optical fiber 20, the glass fiber is exposed by removing the tape covering and the fiber covering at the other end portion 22. That is, in the optical fiber 20, the covering is removed in a portion located at the outside of the ferrule 12.

In addition, in the optical fiber 20, the tape covering is removed and the fiber covering remains at a part of the intermediate portion 23 side of the one end portion 21. Furthermore, in the optical fiber 20, the tape covering and the fiber covering are removed and the glass fiber is exposed at a part of a side opposite to the intermediate portion 23 of the one end portion 21. The One end portion 21 of the optical fiber 20, for example, is located in the fiber arrangement groove 15g at a part where the glass fiber is exposed, and is inserted into the fiber insertion hole 15h.

The one end portions 21 of the plurality of optical fibers 20, for example, are inserted into the fiber insertion holes 15h outside the holding portion 15 in the second direction among the plurality of fiber insertion holes 15h. As one example, the optical fibers 20 are inserted into eight fiber insertion holes 15h, except for four fiber insertion holes 15h of the central side of the holding portion 15 in the second direction. In this case, the fiber insertion holes 15h of the central side of the holding portion 15 in the second direction are unused (dummy) fiber insertion holes 15h into which the optical fibers 20 are not inserted.

The fiber-shaped member 11 is inserted into at least one of the unused fiber insertion holes 15h. That is, the fiber-shaped member 11 is inserted into, for example, the fiber insertion hole 15h of the central side of the holding portion 15 in the second direction among the plurality, of fiber insertion holes 15h. As one example, the fiber-shaped member 11 is inserted into the four unused fiber insertion holes 15h of the central side of the holding portion 15 in the second direction. In a case where the number of the fiber-shaped members 11 is equal to the number obtained by subtracting the number of the optical fibers 20 from the number of the fiber insertion holes 15h, all the fiber insertion holes 15h are occupied by the fiber-shaped members 11 and the optical fibers 20. The fiber-shaped members 11 are held by the holding portion 15 in a state of being inserted into the fiber insertion holes 15h in the one end portion 11a and arranged in the fiber arrangement grooves 15g in the other end portion 11b.

The other end portion 11b of the fiber-shaped member 11, for example, reaches an end of the holding portion 15 of the second end surface 14s side and does not reach the second end surface 14s. That is, the other end portion 11b of the fiber-shaped member 11 is located at the inside of the ferrule 12. The fiber-shaped member 11 and the optical fiber 20 are bonded to the ferrule 12 (holding portion 15) by a resin adhesive. An end surface of the one end portion 11a of the fiber-shaped member 11 and an end surface of the one end 21 portion of the optical fiber 20 are exposed to the first end surface 13s so as to become substantially the same surface as the first end surface 13s.

The boot 30 is formed in, for example, a rectangular shape. A part of the boot 30 is inserted from opening of the frame portion 16 in the second end surface 14s into the inside (space 16s) of the ferrule 12. The remaining part of the boot 30 is exposed from the second end surface 14s to the outside of the ferrule 12. In the boot 30, a single through-hole 31 is formed herein. The plurality of optical fibers 20 is inserted into the through-hole 31 in a lump.

Herein, a part of the intermediate portion 23 of the optical fiber 20 is disposed inside the through-hole 31. Therefore, the plurality of optical fibers 20 is disposed in the inside of the ferrule 12 through the boot 30 and extends to the outside of the ferrule 12. The boot 30 is bonded to the ferrule 12 by, for example, a resin adhesive. The adhesive is supplied from the window portion 16w of the frame portion 16 to the inside of the space 16s, bonds the fiber-shaped member 11 and the optical fiber 20 to the fiber insertion hole 15h and the fiber arrangement groove 15g, and bonds the boot 30 to the frame portion 16.

Figure 7:
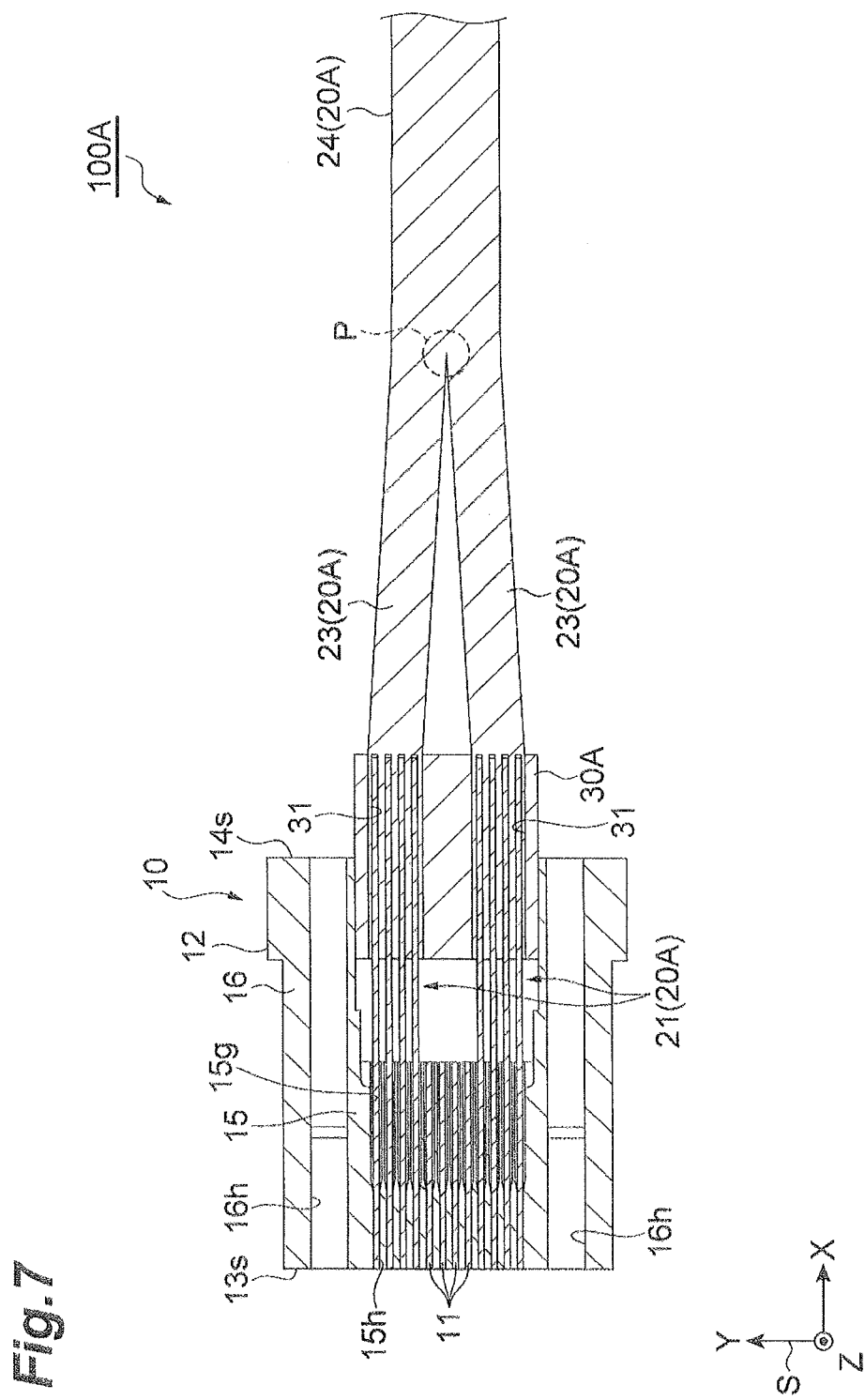
FIG. 7 is a cross-sectional view taken along line VII-VII of FIG. 6B.

FIG. 6A is a top view of an optical fiber with a connector according to a second embodiment. FIG. 6B is a side view of the optical fiber with the connector according to the second embodiment. FIG. 7 is a cross-sectional view taken along line VII-VII of FIG. 6B. An optical fiber with a connector 100A illustrated in each figure differs from the optical fiber with the connector 100 according to the first embodiment, in that an optical fiber 20A is provided instead of the optical fiber 20 and a boot 30A is provided instead of the boot 30. The other points of the optical fiber with the connector 100A are the same as the optical fiber with the connector 100.

The optical fiber 20A is attached to the connector 10. The number of the optical fibers 20A is less than the number of the fiber insertion holes 15h. For example, the number of the optical fibers 20A is eight. The optical fiber 20A includes, for example, four TX fibers and four RX fibers. Each of the optical fibers 20A includes one end portion 21, an extension portion 24, and the intermediate portion 23 between the one end portion 21 and the extension portion 24. The one end portion 21 is located at the inside of the ferrule 12. The extension portion 24 is located at the outside of the ferrule 12. That is, the optical fiber 20A extends to the outside of the ferrule 12 beyond the second end surface 14s.

The plurality of optical fibers 20A is integrated by being covered with a tape covering in a lump in the extension portion 24. That is, the plurality of optical fibers 20A is integrated in the outside of the ferrule 12. In addition, the plurality of optical fibers 20A is divided into two groups (that is, divided into two parts) by division of the tape covering in the intermediate portion 23. As one example, in a case where eight optical fibers 20A are present, the eight optical fibers 20A are divided into two groups each having four optical fibers in the intermediate portion 23. At least a part of each intermediate portion 23 is disposed inside the ferrule 12 together with the boot 30A. Therefore, the plurality of optical fibers 20A is divided into two parts in the inside of the ferrule 12.

The plurality of optical fibers 20A is integrated by being covered with a tape covering in each group in the intermediate portion 23. Furthermore, the plurality of optical fibers 20A is not covered with the tape covering in the one end portion 21 and is not integrated. More specifically, each of the optical fibers 20A includes a glass fiber and a fiber covering that covers the glass fiber. In the optical fiber 20A, the tape covering is removed and the fiber covering remains at a part of the intermediate portion 23 side in the one end portion 21. Furthermore, in the optical fiber 20A, the tape covering and the fiber covering are removed and the glass fiber is exposed at a part of a side (front end side) opposite to the intermediate portion 23 in the one end portion 21. The one end portion 21 of the optical fiber 20A, for example, is located in the fiber arrangement groove 15g at a part where the glass fiber is exposed, and is inserted into the fiber insertion hole 15h.

For example, an adhesive is disposed at a part P of a boundary between the intermediate portion 23 and the extension portion 24, that is, a part P from which the division of the tape covering starts, and the part P is reinforced such that the division does not unintentionally progress to the extension portion 24 side.

The boot 30A is formed in, for example, a rectangular shape. A part of the boot 30A is inserted from the opening of the frame portion 16 in the second end surface 14s to the inside (space 16s) of the ferrule 12. The remaining part of the boot 30A is exposed from the second end surface 14s to the outside of the ferrule 12. A pair of through-holes 31 are formed in the boot 30A. A plurality of optical fibers 20 is inserted into each of the through-holes 31 for each group in a lump.

Herein, a part of the intermediate portion 23 of the optical fiber 20A is disposed inside the through-hole 31. The plurality of optical fibers 20A is disposed inside the ferrule 12 through the boot 30A and extends to the outside of the ferrule 12. The boot 30A is bonded to the ferrule 12 by, for example, a resin adhesive.

As described above, in the optical fibers with the connector 100 and 100A, the plurality of fiber insertion holes 15h is formed with respect to the holding portion 15 of the ferrule 12. The optical fibers 20 and 20A are inserted into some fiber insertion holes 15h among the plurality of fiber insertion holes 15h, and the fiber-shaped members 11 are inserted into other fiber insertion holes 15h. That is, since the unused fiber insertion holes 15h occur, the fiber count is reduced. Due to this, an optical fiber waste is suppressed.

In addition, according to the optical fibers with the connector 100 and 100A, the fiber-shaped members 11 are inserted into at least one of the unused fiber insertion holes 15h. Therefore, it is possible to suppress the penetration of an abrasive or the like into the unused fiber insertion holes 15h. In addition, it is possible to suppress an occurrence of a difference in a polished state of the first end surface 13s of the ferrule 12 in a portion adjacent to the fiber insertion hole 15h, into which the optical fibers 20 and 20A are inserted, and a portion adjacent to the unused fiber insertion holes 15h in the ferrule 12.

In the optical fibers with the connector 100 and 100A, the one end portions 21 of the optical fibers 20 and 20A may be inserted into the fiber insertion holes 15h of arbitrary positions of the holding portion 15 in the second direction. For example, the one end portions 21 of the optical fibers 20 and 20A are inserted into the fiber insertion holes 15h of the central side of the holding portion 15 in the second direction among the plurality of fiber insertion holes 15h. As a specific example, the one end portions 21 of the optical fibers 20 and 20A can be inserted into eight fiber insertion holes 15h of the central side of the second direction among twelve fiber insertion holes 15h, and the fiber-shaped members 11 can be inserted into two fiber insertion holes 15h of one outer side of the second direction and two fiber insertion holes 15h of the other outer side of the second direction.

While the optical fibers with the connector have been described herein with reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and subcombinations of the structures and features described herein are contemplated and will be apparent to a skilled person having knowledge of this disclosure.

Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. An optical connection assembly comprising:
   a first connector; and
   a plurality of optical fibers attached to the first connector, wherein the first connector includes:
   at least one fiber-shaped member; and
   a ferrule including a first end surface and a second end surface arranged in a first direction, and a holding portion holding the optical fibers and a fiber-shaved member,
   in the holding portion a plurality of fiber insertion holes extending from the first end surface in the first direction is formed such that the optical fibers and the at least one fiber-shaped member are insertable thereinto,
   one end portion of an optical fiber and one end portion of a fiber-shaped member are held by the holding portion in a state of being inserted into a fiber insertion hole,
   an optical fiber extends to the outside of the ferrule beyond the second end surface, and
   the other end portion of the fiber-shaped member is located inside the ferrule,
   wherein three or more of the fiber insertion holes are provided in the holding portion so as to be arranged in a second direction intersecting with the first direction, and
   fiber-shaped members are inserted into fiber insertion holes of a central side of the holding portion in the second direction among the plurality of fiber insertion holes.

2. The optical connection assembly according to claim 1, wherein a fiber-shaped member includes a glass fiber.

3. The optical connection assembly according to claim 1, wherein the other end portion of the optical fiber is attached to a second connector.

4. The optical connection assembly according to claim 1, wherein twelve of the fiber insertion holes are provided in the holding portion, and
   fiber-shaped members are inserted into the four fiber insertion holes of the central side of the holding portion in the second direction among the plurality of fiber insertion holes.

5. The optical connection assembly according to claim 1, wherein in an optical fiber, a covering is removed at a part located outside the ferrule.

6. The optical connection assembly according to claim 1, wherein the plurality of optical fibers are integrated at the outside of the ferrule.

7. The optical connection assembly according to claim 6, wherein the plurality of optical fibers is divided into two parts in the inside of the ferrule.

* * * * *